United States Patent
Thompson et al.

(10) Patent No.: US 10,851,841 B1
(45) Date of Patent: Dec. 1, 2020

(54) INTEGRATED BLADE ROOT BEARING CARRIER ASSEMBLY

(71) Applicant: Bell Textron Inc., Fort Worth, TX (US)

(72) Inventors: George Matthew Thompson, Lewisville, TX (US); Jonathan Knoll, Burleson, TX (US); Nicholas Carlson, Dallas, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

(21) Appl. No.: 16/540,633

(22) Filed: Aug. 14, 2019

(51) Int. Cl.
| | |
|---|---|
| *F16C 33/78* | (2006.01) |
| *B64C 27/48* | (2006.01) |
| *F16C 33/41* | (2006.01) |
| *F16C 19/16* | (2006.01) |
| *B64F 5/10* | (2017.01) |
| *B64C 27/20* | (2006.01) |
| *B64C 29/00* | (2006.01) |

(52) U.S. Cl.
CPC .......... *F16C 33/7893* (2013.01); *B64C 27/48* (2013.01); *F16C 19/16* (2013.01); *F16C 33/41* (2013.01); *F16C 33/7806* (2013.01); *B64C 27/20* (2013.01); *B64C 29/0016* (2013.01); *B64F 5/10* (2017.01); *F16C 2326/43* (2013.01)

(58) Field of Classification Search
CPC .............. F16C 33/3806; F16C 33/3812; F16C 33/3818; F16C 33/41; F16C 33/412; F16C 33/418; F16C 33/7806; F16C 33/7893; F16C 2326/43; B64C 27/48
See application file for complete search history.

(56) References Cited

U.S. PATENT DOCUMENTS

| | | | | |
|---|---|---|---|---|
| 3,029,876 A | * | 4/1962 | Scott ....................... | F16C 43/06 416/205 |
| 3,554,621 A | * | 1/1971 | McAllister .......... | F16C 33/3831 384/484 |
| 4,895,215 A | * | 1/1990 | Rives ..................... | E21B 10/25 175/359 |
| 6,843,604 B2 | * | 1/2005 | Hiramatsu ............ | F16C 19/163 384/450 |
| 7,422,419 B2 | | 9/2008 | Carvalho | |
| 7,597,481 B2 | * | 10/2009 | Scherpf ................... | F16C 33/80 384/470 |

(Continued)

FOREIGN PATENT DOCUMENTS

| | | | |
|---|---|---|---|
| DE | 3104261 | * | 9/1982 |
| EP | 0822137 A3 | | 3/1999 |
| EP | 3184418 A1 | | 6/2017 |

*Primary Examiner* — James Pilkington
(74) *Attorney, Agent, or Firm* — Patent Capital Group

(57) ABSTRACT

One embodiment is a bearing carrier assembly including a circular shield having top and bottom surfaces; and a number of bearing separators integrated with the bottom surface of the shield, wherein each pair of bearing separators defines a receptacle for receiving and retaining a bearing therewithin and wherein the shield blocks the received bearings from debris and retains lubricant around the received bearings. Each of the bearing separators may include a spacer element for separating adjacent ones of the bearings. The bearing carrier assembly may be made up of a number of carrier sections that interconnect to form the bearing carrier assembly.

17 Claims, 12 Drawing Sheets

(56) References Cited

U.S. PATENT DOCUMENTS

| | | | |
|---|---|---|---|
| 8,534,920 B2 * | 9/2013 | Aida | F16C 33/3875 384/470 |
| 2005/0084379 A1 | 4/2005 | Schreiber | |
| 2008/0304973 A1 | 12/2008 | Talasco et al. | |
| 2013/0336796 A1 | 12/2013 | Carvalho et al. | |
| 2014/0010661 A1 | 1/2014 | Hancock | |
| 2018/0112545 A1 | 4/2018 | Gaillard et al. | |

* cited by examiner

INTEGRATED BLADE ROOT BEARING CARRIER ASSEMBLY

TECHNICAL FIELD

This disclosure relates in general to the field of aircraft and, more particularly, though not exclusively, to an integrated blade root bearing carrier assembly for aircraft.

BACKGROUND

Rigid and semirigid rotor systems have rotor blades securely coupled to arms of a rotor hub while permitting feathering of the rotor blades about their respective pitch-change axes. Axial loads of the rotor blades are transferred to the rotor hub through thrust bearings positioned between the root ends of the rotor blades and the interior of the rotor hub. The thrust bearings must have larger diameters than the openings from which the rotor blades extend. For this reason, rigid and semirigid rotor hubs are often constructed by using a two-piece clam-shell type rotor hub that is bolted together after the rotor blades and thrust bearings are installed and/or the rotor hub includes a ball port proximate each hub arm to facilitate the insertion of roller elements therein. However, the additional hardware and the additional material required to facilitate bolting the two pieces together increases the weight of the two-piece rotor hubs. And the inclusion of multiple ball ports through the rotor hub reduces the strength of the rotor hub, requiring yet more material, and may prevent an optimal load path through the rotor hub.

SUMMARY

One embodiment is a bearing carrier assembly including a circular shield having top and bottom surfaces; and a number of bearing separators integrated with the bottom surface of the shield, wherein each pair of bearing separators defines a receptacle for receiving and retaining a bearing therewithin and wherein the shield blocks the received bearings from debris and retains lubricant around the received bearings. Each of the bearing separators may include a spacer element for separating adjacent ones of the bearings. The bearing carrier assembly may be made up of a number of carrier sections that interconnect to form the bearing carrier assembly.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1:
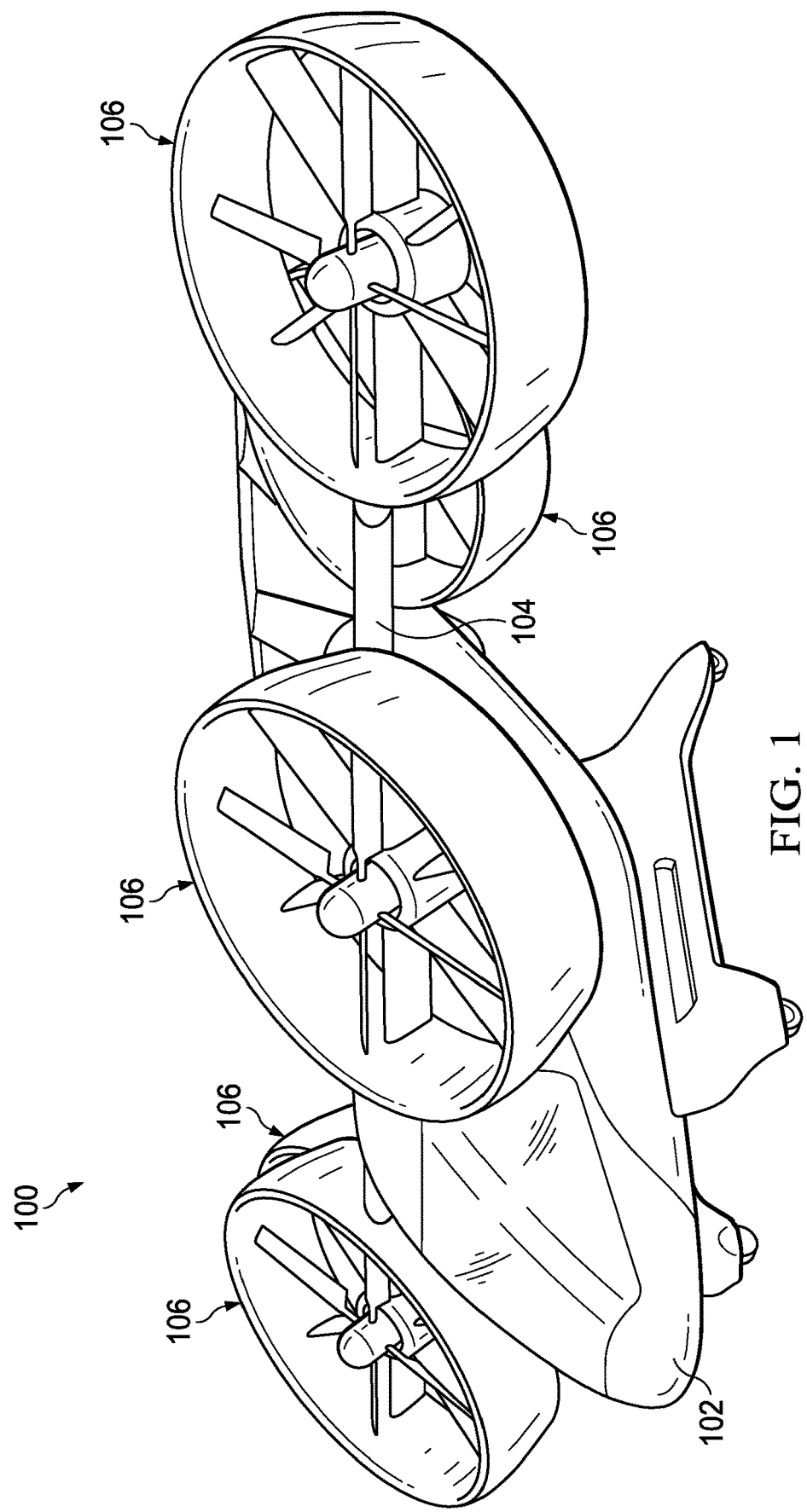
FIG. 1 is an oblique view of an aircraft including a rotor assembly, according to this disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect (s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Described herein is a blade root bearing carrier assembly that includes integrated bearing separators and a shield. In particular, the integrated separators retain and space the ball bearings, while the shield shields the bearings from debris and retains lubrication around the bearings. In certain embodiments, the assembly includes one or more carrier sections that include recesses for receiving ball bearings. A clearance cut at each ball receiving recess allows installation of a ball into the recess. The clearance cut is smaller than the ball diameter so that the ball snaps into place and is retained within the recess. The assembly may further include a shield to which the separators are attached, one or more handles or other features to aid handling and installation of the carriers, a linking feature to connect the carriers to one another and maintain even spacing therebetween, and lips or other features for accepting soft sealing material, such as an O-ring.

Figure 2:
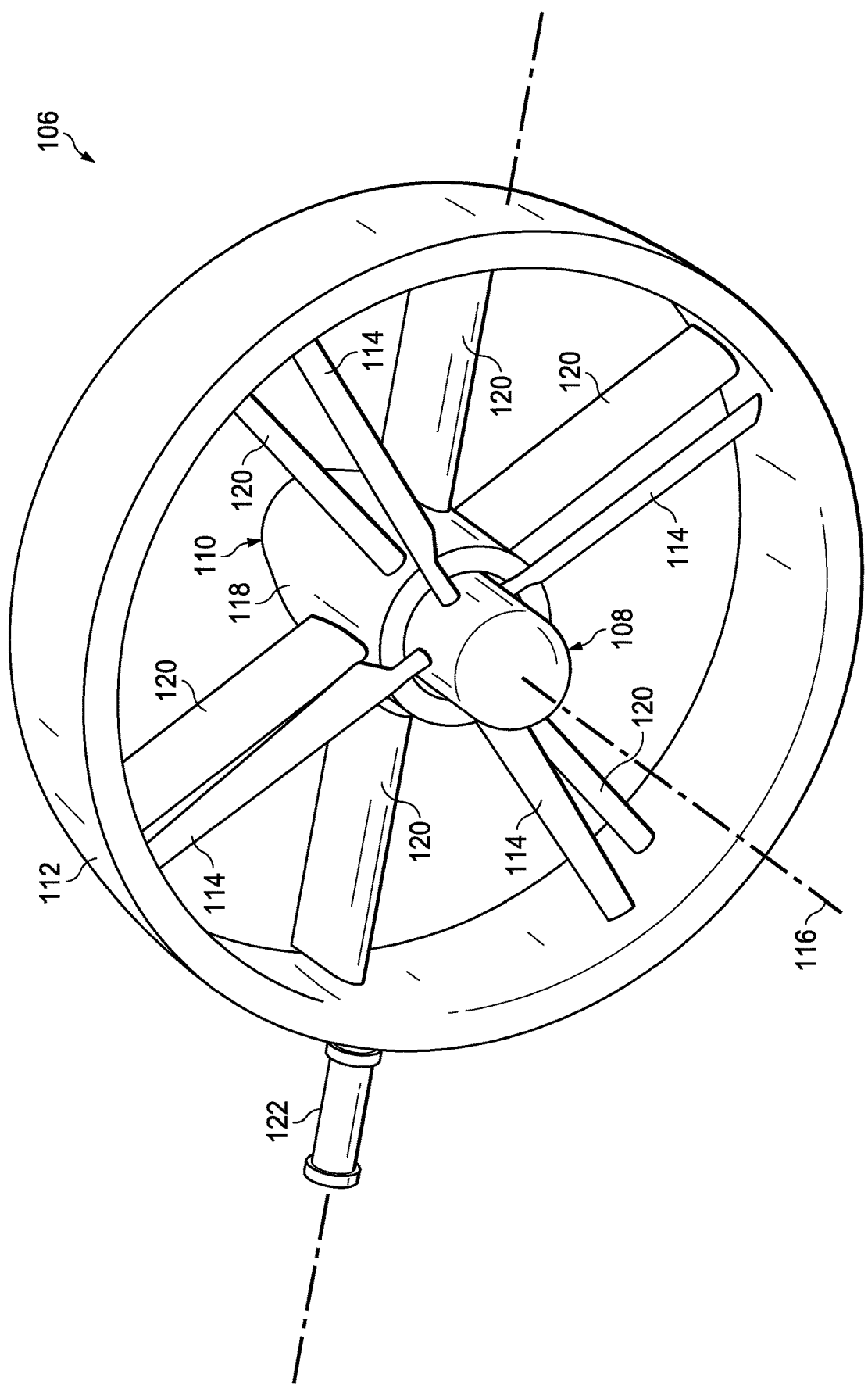
FIG. 2 is an oblique view of a ducted fan of the aircraft of FIG. 1.

FIG. 1 shows an aircraft 100 that is convertible between a helicopter mode, which allows for vertical takeoff and landing, hovering, and low speed directional movement, and an airplane mode, which allows for forward flight as well as horizontal takeoff and landing. Aircraft 100 includes a fuselage 102, a wing 104, and a plurality of ducted fans 106 rotatably coupled to fuselage 102 or wing 104. As best shown in FIG. 2, each ducted fan 106 includes a rotor assembly 108, a flow-straightening stator assembly 110, and a duct 112 surrounding rotor assembly 108 and stator assembly 110. Rotor assembly 108 includes a plurality of rotor blades 114 configured to rotate about a mast axis 116. Rotation of rotor blades 114 about mast axis 116 generates lift while operating in helicopter mode and thrust while operating in airplane mode. Stator assembly 110 is positioned downstream of rotor blades 114 and includes a stator hub 118 centrally located within duct 112 and a plurality of stator vanes 120 coupled between duct 112 and stator hub 118. Stator hub 118 may house an electric motor therein configured to produce rotational energy that drives the rotation of rotor assembly 108. Alternatively, stator hub 118 may house a gearbox therein that drives the rotation of rotor assembly 108, wherein the gearbox receives rotational energy from a driveshaft passing through an attachment post 122 and the adjacent stator vane 120.

Figure 3:
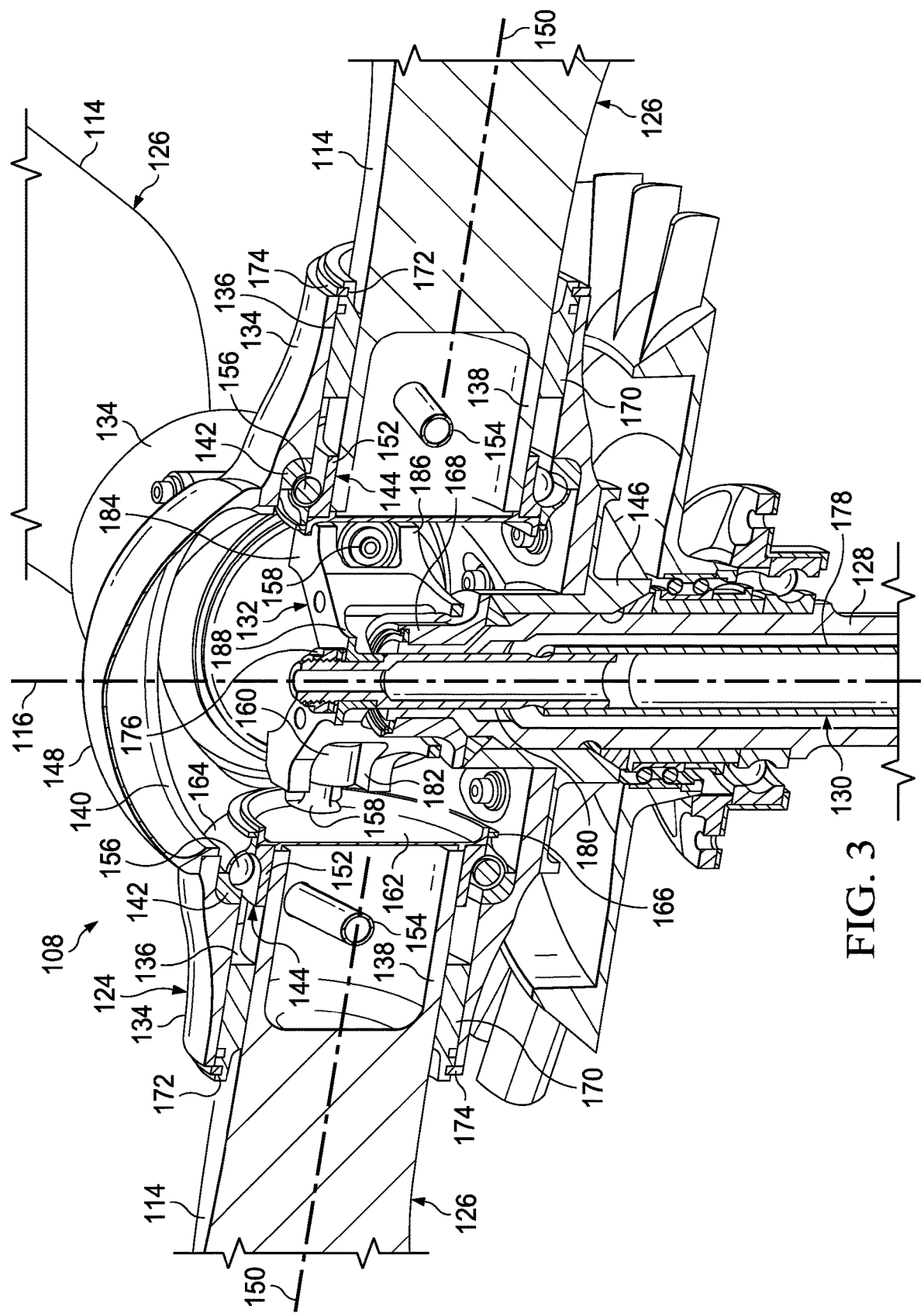
FIG. 3 is an oblique cross-sectional view of a rotor assembly, according to this disclosure.
Figure 4:
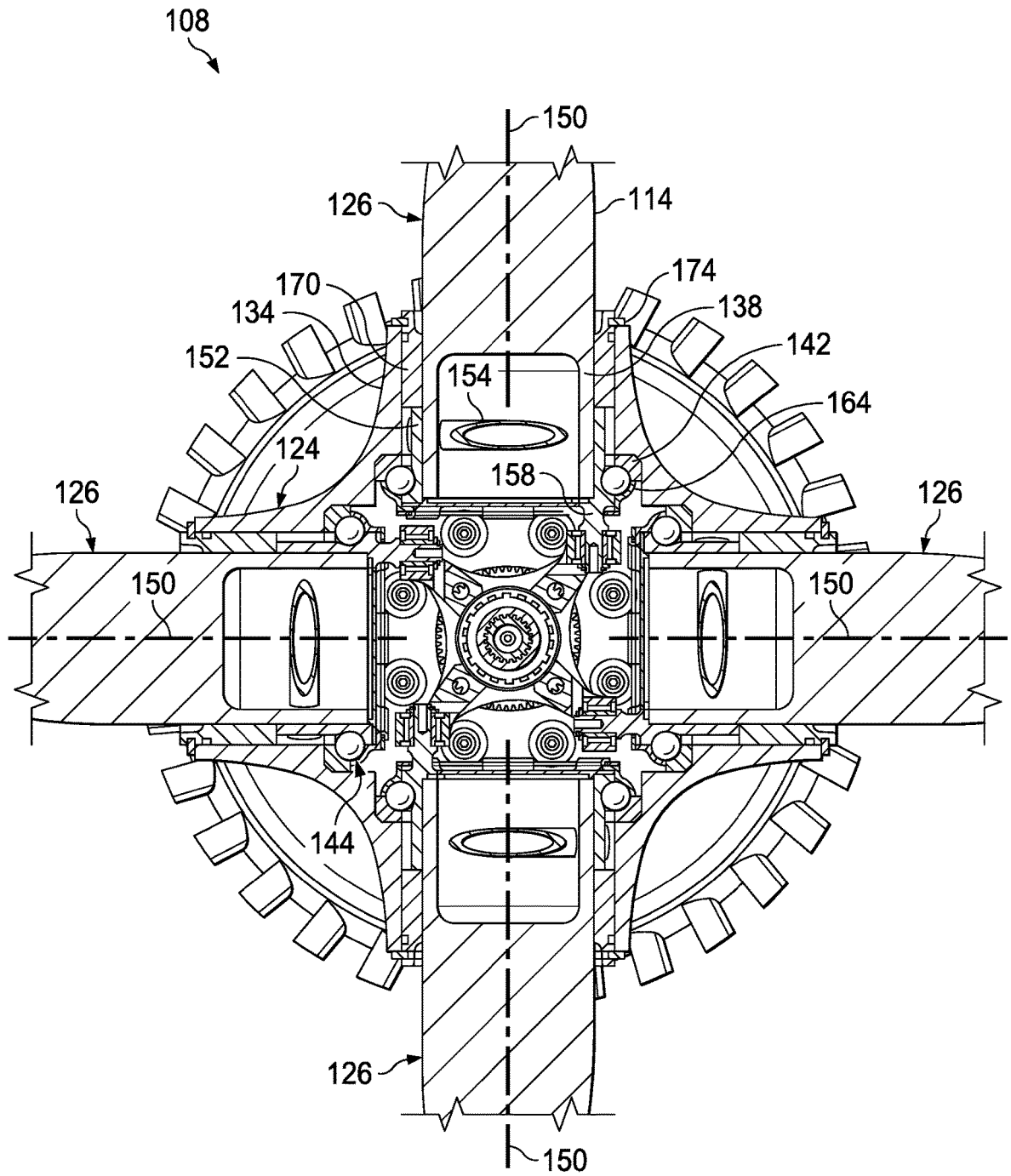
FIG. 4 is a cross-sectional top view of the rotor assembly of FIG. 3.

Referring to FIGS. 3 and 4, the components of rotor assembly 108 are described below. Rotor assembly 108 includes a rotor hub 124, a plurality of rotor blade assemblies 126 coupled to rotor hub 124, a rotor mast 128, a control tube 130, and a crosshead 132. Rotor hub 124 is formed of a unitary structure that includes a plurality of hub arms 134. Each hub arm 134 includes a rotor blade opening 136 configured to receive a blade root 138 of one of rotor blades 114 therein. In certain embodiments, rotor hub 124 may include a single access port 140, centrally located relative to hub arms 134, that enables access to blade roots 138 of rotor blades 114. Each hub arm 134 also includes an outer race 142 of a thrust bearing 144 coupled thereto at the innermost end of rotor blade opening 136. While outer races 142 are shown as a separate component coupled to the unitary structure, outer races 142 may also be integral with the unitary structure of rotor hub 124. Rotor hub 124 may be directly coupled to rotor mast 128 for common rotation therewith about mast axis 116. Alternatively, rotor hub 124 may be coupled to rotor mast 128 via a mast adapter 146. Rotor hub 124 further includes a fairing 148 coupled thereto which covers access port 140 during operation of rotor assembly 108.

Figure 5:
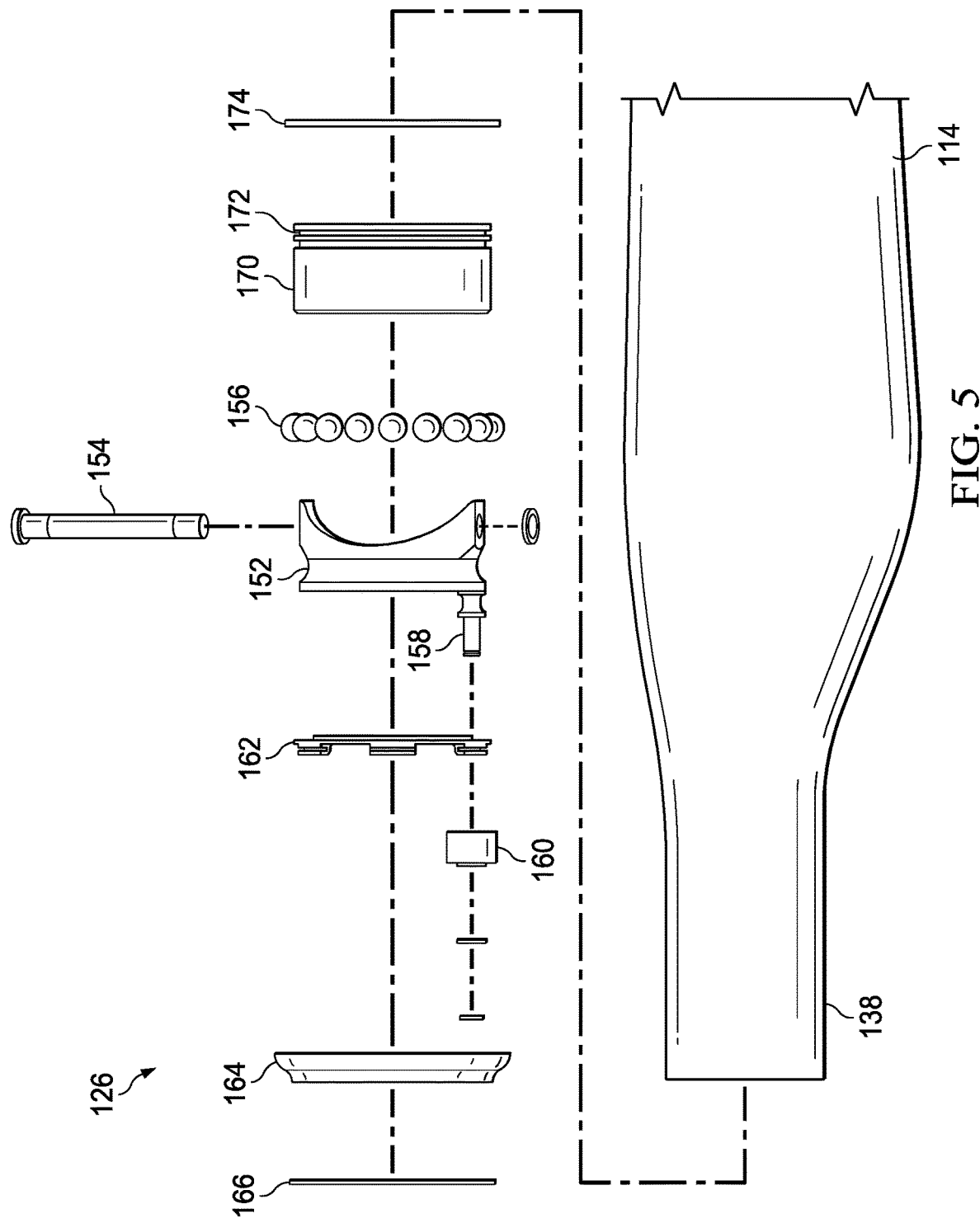
FIG. 5 is an exploded side view of a rotor blade assembly of the rotor assembly of FIG. 3.

The components of rotor blade assemblies 126 are illustrated in FIGS. 3-5. Each rotor blade assembly 126 includes one rotor blade 114 with its blade root 138 disposed within one of hub arms 134 and being rotatable relative thereto about a pitch-change axis 150. An inner race 152 of thrust bearing 144 encircles each blade root 138 and is coupled thereto via a fastener 154. Each rotor blade assembly 126 further includes a plurality of roller elements 156 of thrust bearing 144 positioned around the circumference of inner race 152 and disposed between inner race 152 and outer race 142. Roller elements 156 carry the axial loads along pitch-change axis 150 while enabling rotor blade 114 to rotate about pitch-change axis 150. While roller elements 156 are shown as spherical, it should be understood that they may be cylindrical, tapered, needle, or any other suitable shape. Each rotor blade assembly 126 also includes a pin 158 extending from blade root 138 configured to impart rotation of rotor blade 114 about pitch-change axis 150 in response to translation of crosshead 132 along mast axis 116. Pin 158 may be coupled to inner race 152, coupled directly to blade root 138, or, as shown, pin 158 may be unitarily formed with inner race 152. Furthermore, pin 158 may include a roller bearing 160 coupled thereto to permit translation of pin 158 relative to crosshead 132. An endcap 162 is coupled to the innermost end of rotor blade 114 and/or inner race 152.

In accordance with features of embodiments described herein, roller elements 156 are retained within an integrated root bearing carrier assembly 164, which is directly coupled to endcap 162 via a retaining ring 166. As will be described in greater detail below, integrated root bearing carrier assembly 164 provides a separator between each pair of adjacent roller elements 156 retained therein as well as a shield for the roller elements 156. In certain embodiments, and as will also be described, the design and spacing of spacers is such that roller elements 156 may be snapped into and out of the root bearing carrier assembly 164 to be retained therein and released therefrom, respectively. While shown as a separate component, it should be understood that endcap 162 may be unitarily formed with inner race 152. A roller or journal bearing 170 is coupled to each rotor blade 114 adjacent to inner race 152 to react sheer loads between rotor blade 114 and hub arm 134. Journal bearing 170 includes a groove 172 that receives a rotor blade retainer 174 therein to resist inward movement of rotor blade assembly 126 after the assembly of rotor assembly 108 is complete.

Referring now to FIG. 3, control tube 130 extends coaxially through rotor mast 128 and is coupled thereto for common rotation therewith about mast axis 116, but control tube 130 is translatable relative to rotor mast 128 along mast axis 116. Mast adapter 146 is coupled to rotor mast 128 via a mast nut 168. Crosshead 132 is coupled to control tube 130 via a nut 176. Control tube 130 comprises a lower tube 178 coupled to an upper tube 180, wherein upper tube 180 has a smaller outer diameter than lower tube 178. This configuration may allow for lower tube 178 to be preinstalled within rotor mast 128 prior to installation of rotor assemblies 126, giving the installer more room to operate within rotor hub 124 while installing rotor blade assemblies 126, and then inserting upper tube 180 and crosshead 132 after the installation of rotor assemblies 126. Lower tube 178 is coupled to an actuator configured to impart translational motion thereto along mast axis 116 and upper tube 180 is coupled to crosshead 132. While control tube 130 is shown as a two-piece structure, it should be understood that control tube 130 may comprise a unitary structure.

Crosshead 132 comprises a unitary structure and includes a plurality of slots 182, each being defined by an upper tab 184 and a lower tab 186. Each slot 182 is configured to receive one pin 158 therein, such that upwards translation of control tube 130 along mast axis 116 causes lower tabs 186 to push pins 158 upwards, through roller bearings 160, causing rotation of rotor blades 114 about pitch-change axes 150 in a first direction and downwards translation of control tube 130 along mast axis 116 causes upper tabs 184 to push pins 158 downwards, through roller bearings 160, causing rotation of rotor blades 114 about pitch-change axes 150 in an opposite second direction. Adjacent to each slot 182 is a recess 188 configured to permit installation of crosshead 132 along mast axis 116 without contacting pins 158.

An example method of assembling rotor assembly 108 is described with reference primarily to FIGS. 3-10. Rotor hub 124 is coupled to mast adapter 146 and then lowered along mast axis 116 into splined engagement with rotor mast 128 and then mast adapter 146 is coupled to rotor mast 128 with mast nut 168. Journal bearing 170 is slipped over blade root 138 and coupled thereto. Inner race 152 of thrust bearing 144 is then slipped over blade root 138 adjacent to journal bearing 170 and then fastener 154 is inserted therethrough to couple inner race 152 to rotor blade 114. Endcap 162 is then coupled to inner race 152 and/or blade root 138 and roller bearing 160 is mounted on pin 158. Blade root 138 is then inserted along pitch-change axis 150 into rotor blade opening 136 of hub arm 134 past an operating position to a bearing installation position, as shown by rotor blade assembly 126a in FIG. 6. In the bearing installation position, blade root 138 is accessible through access port 140 of rotor hub 124. Integrated root bearing carrier assembly 164 is then placed on inner race 152 and coupled thereto. It should be noted that the outer diameter of inner race 152 is limited by the inner diameter of rotor hub opening 136. Once the integrated root bearing carrier assembly 164 is in place, rotor blade assembly 126 may be withdrawn along pitch-change axis 150 to the operating position. With rotor blade assembly 126 in the operating position, rotor blade retainer 174 is inserted into groove 172 of journal bearing 170, thereby retaining rotor blade assembly 126 in the operating position. This procedure is then repeated for each of rotor blade assemblies 126.

Figure 6:
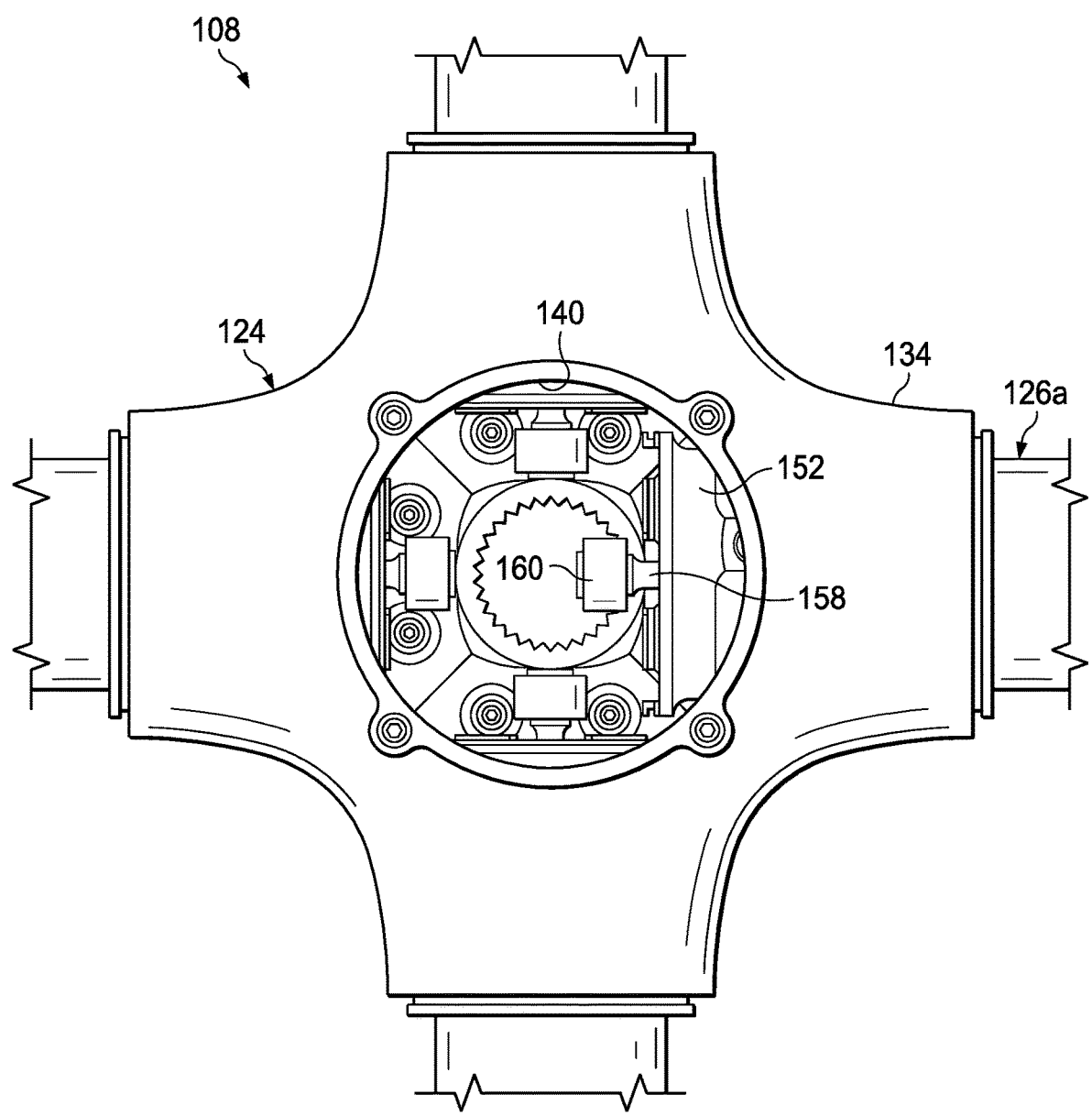
FIG. 6 is a top view of the rotor assembly of FIG. 3, showing a rotor blade positioned for the insertion of roller elements.
Figure 7:
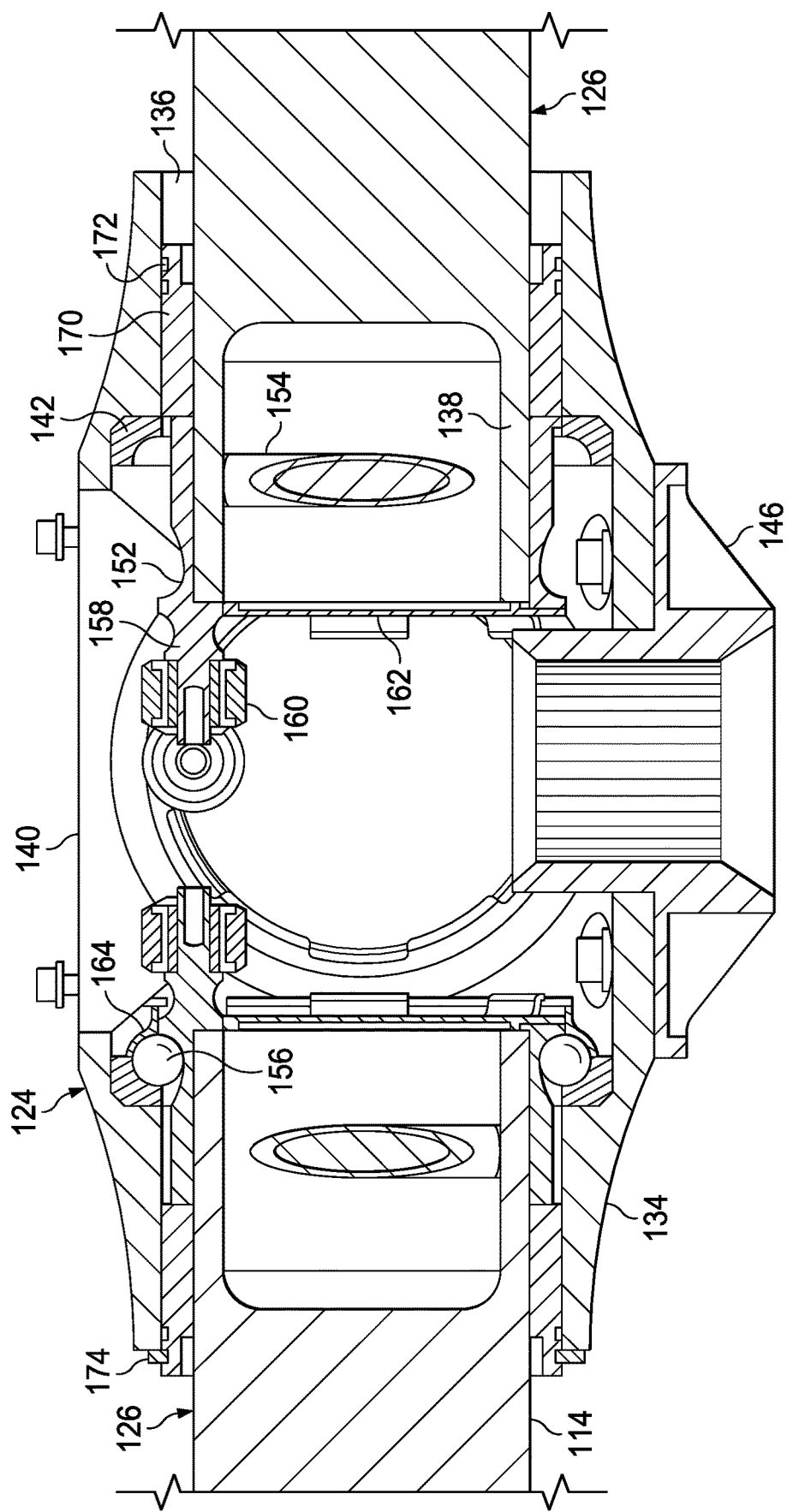
FIG. 7 is a cross-sectional side view of the rotor assembly of FIG. 6.
Figure 8:
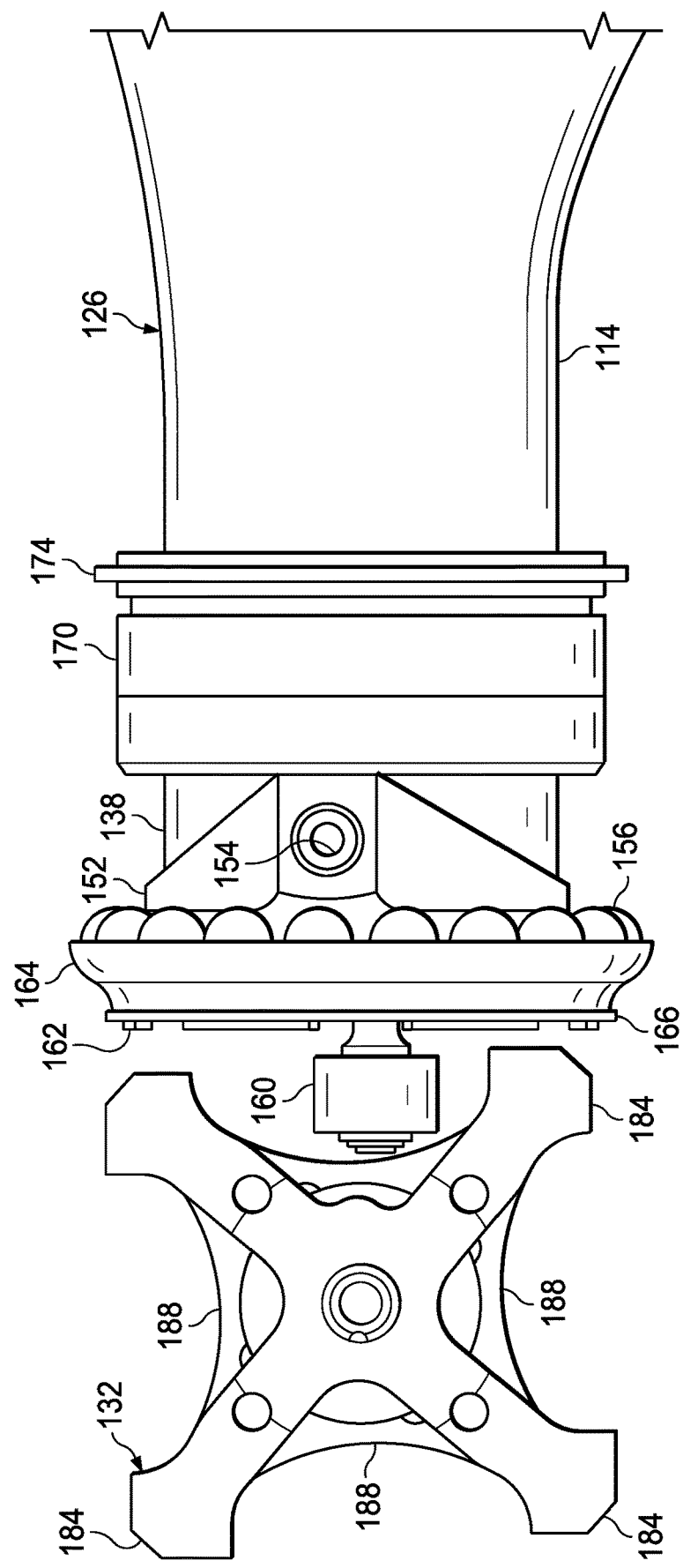
FIG. 8 is a top view of the rotor blade assembly and a crosshead of the rotor assembly of FIG. 3 in a disengaged relationship.

Control tube 130 may then be inserted through rotor mast 128. Control tube 130 may be inserted from bottom of rotor mast 128, or alternatively, lower tube 178 may be inserted from the bottom of rotor mast 128 and upper tube 180 may be inserted through the top of rotor mast 128. Each of rotor blade assemblies 126 is then rotated about its pitch-change axis 150 to a crosshead installation orientation, as shown in FIGS. 6-8. In the crosshead installation orientation, pins 158 are located above pitch-change axes 150. This may place pins 158 their highest vertical orientation, or offset therefrom, depending on the shapes of recesses 188. With rotor blade assemblies 126 in the crosshead installation orientation, crosshead 132 is inserted through access port 140 and is lowered onto control tube 130 to a pin engagement position above an operating position, shown in FIG. 8. While control tube 130 is in the pin engagement position, rotor blade assemblies 126 are rotated about their pitch-change axes until pins 158 are positioned within slots 182. After pins 158 are positioned within slots 182, crosshead 132 is lowered further down control tube 130 to an operating position where crosshead 132 is in splined engagement with control tube 130. Lowering crosshead 132 into operating position will cause rotor blade assemblies 126 to rotate about their respective pitch-change axes 150 into their operating orientations. Crosshead 132 is then coupled to control tube 130 with a nut 176. Finally, fairing 148 is coupled to rotor hub 124 to cover access port 140. Unless expressly stated otherwise, the aforementioned steps may be performed in any order.

Figure 9A:
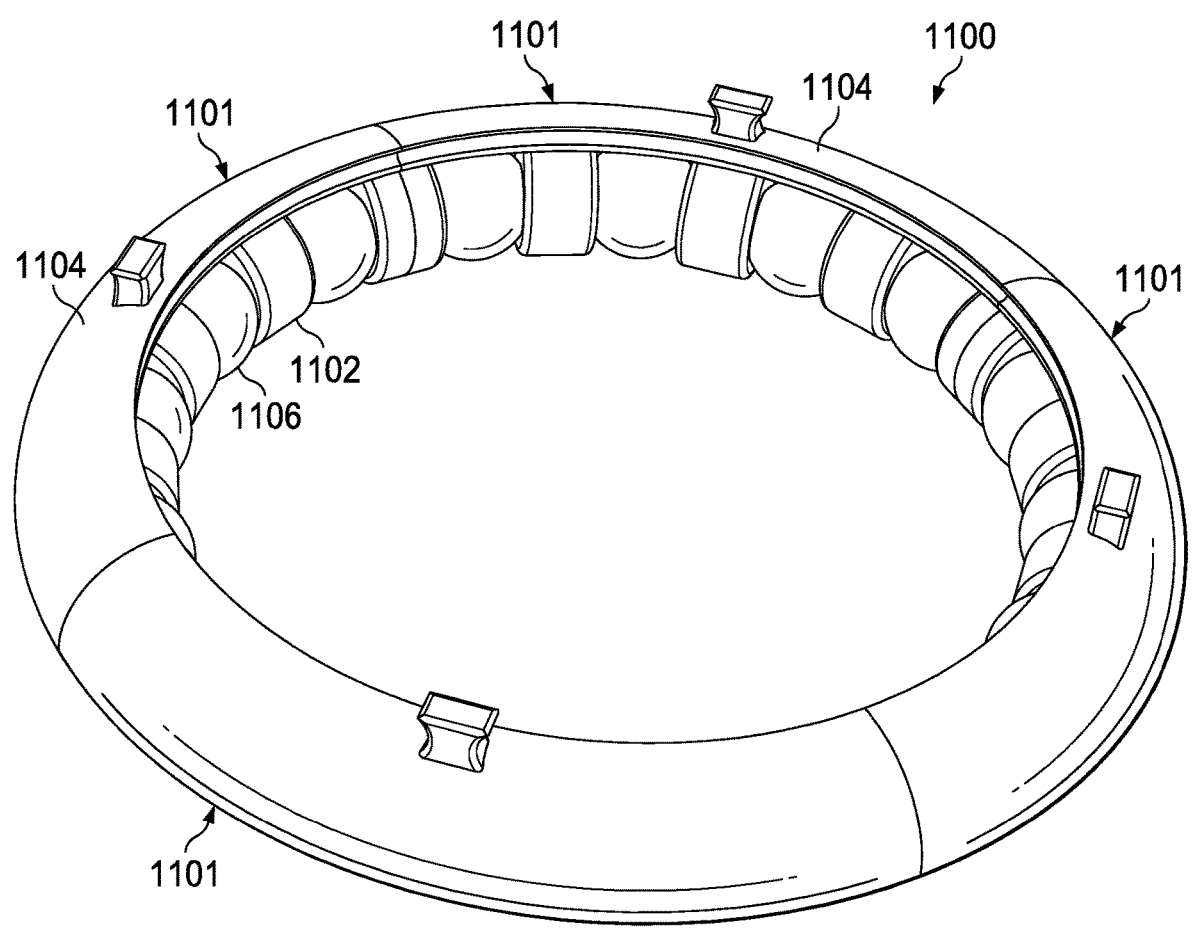
FIG. 9A is a perspective view of an integrated root bearing carrier assembly in accordance with embodiments described herein.
Figure 9B:
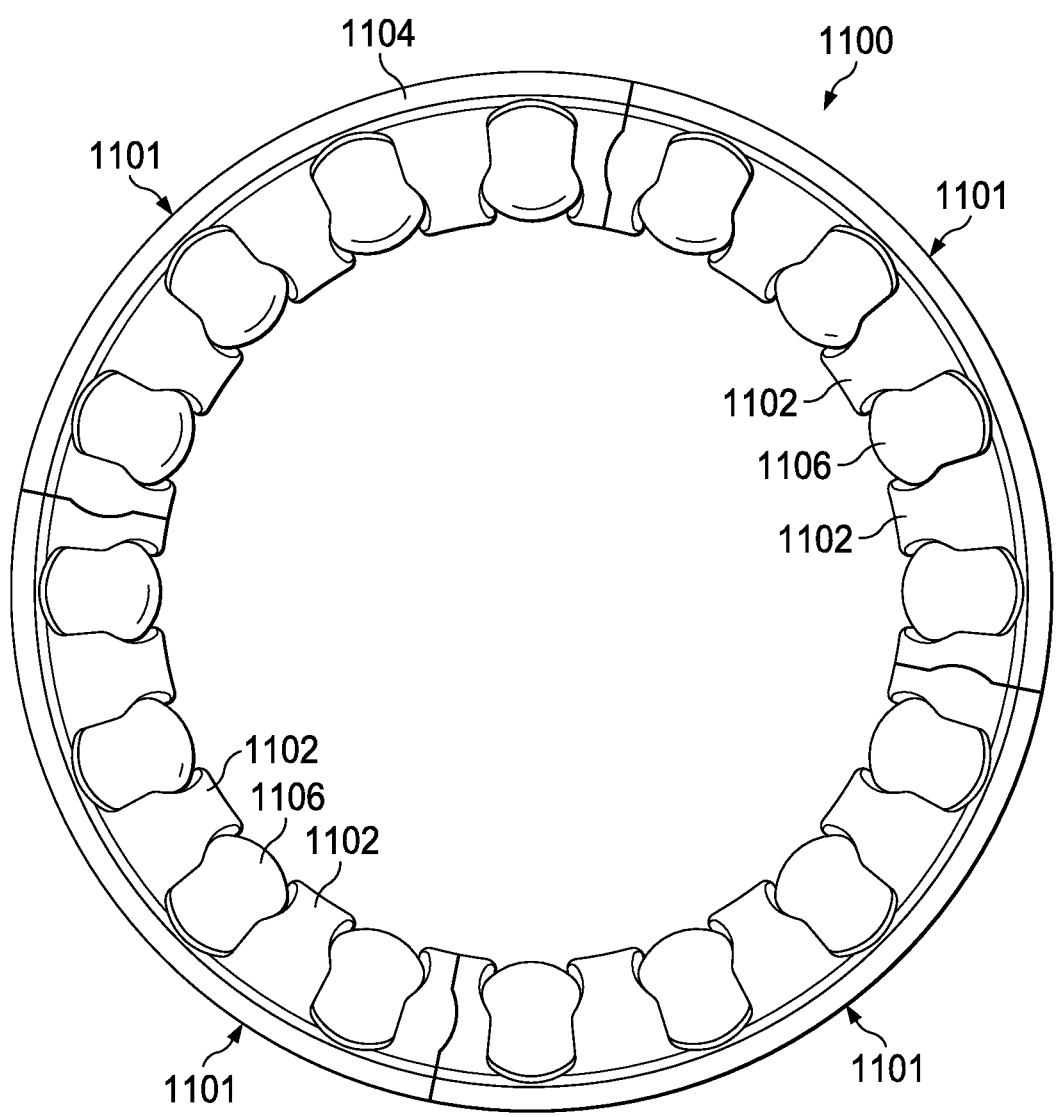
FIG. 9B is a bottom cross-sectional view of the integrated root bearing carrier assembly of FIG. 9A.
Figure 10:
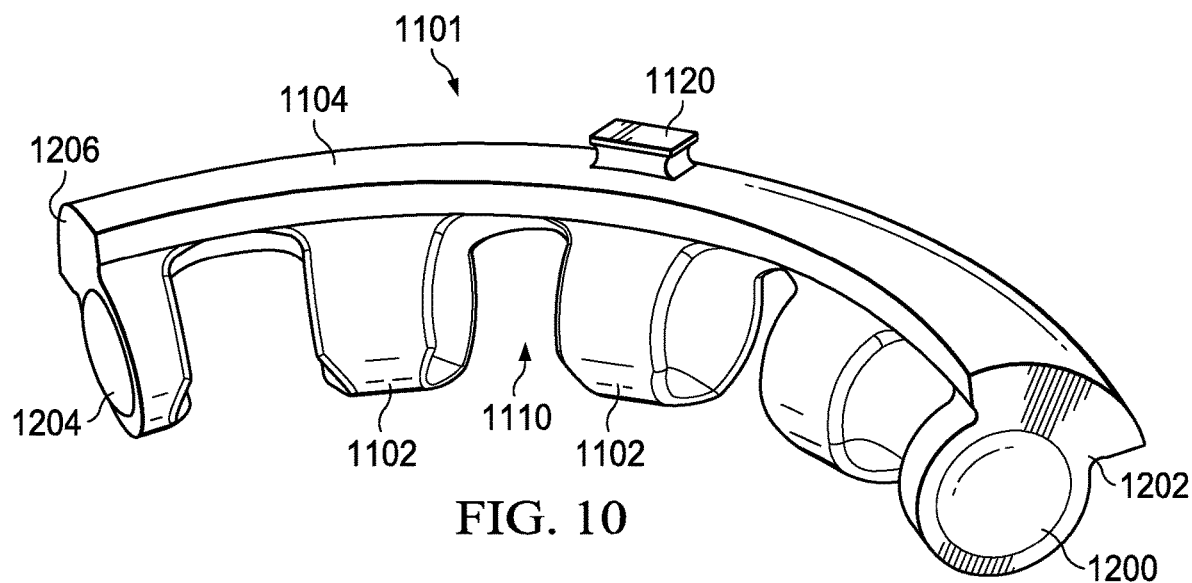
FIG. 10 is a perspective view of a carrier section of the integrated root bearing carrier assembly of FIG. 9A from which the bearings have been removed.
Figure 11:
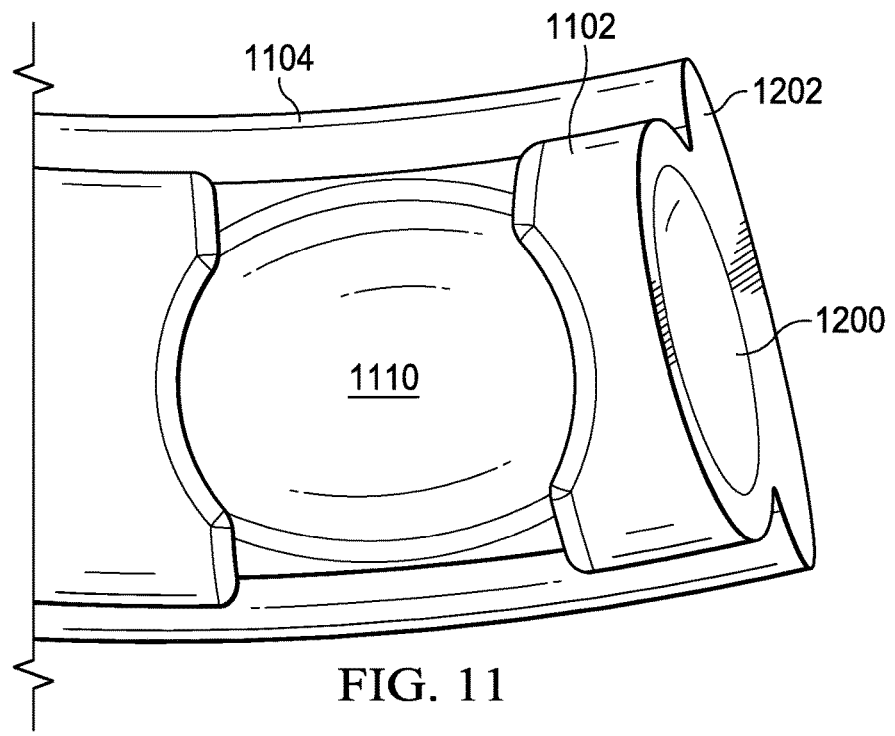
FIG. 11 is a partial cutaway view of an end of the carrier section of FIG. 10.
Figure 12A:
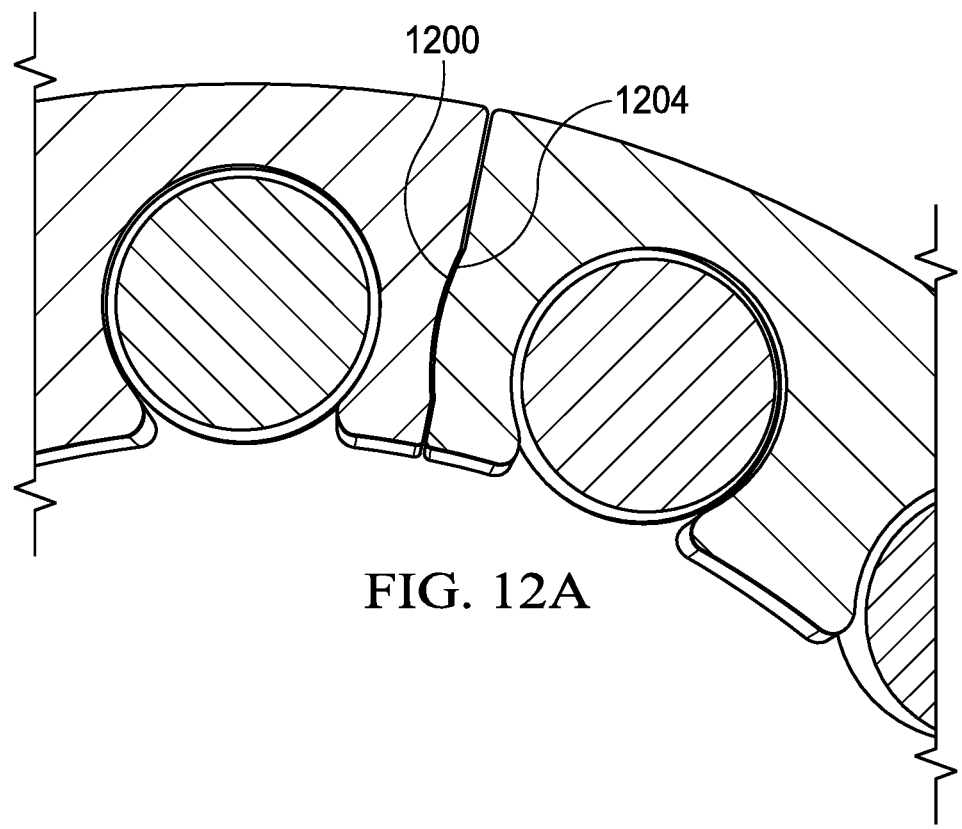
FIG. 12A is a partial bottom cross-sectional view illustrating a linking mechanism that may be deployed in connection with the integrated root bearing carrier assembly of FIG. 9A.
Figure 12B:
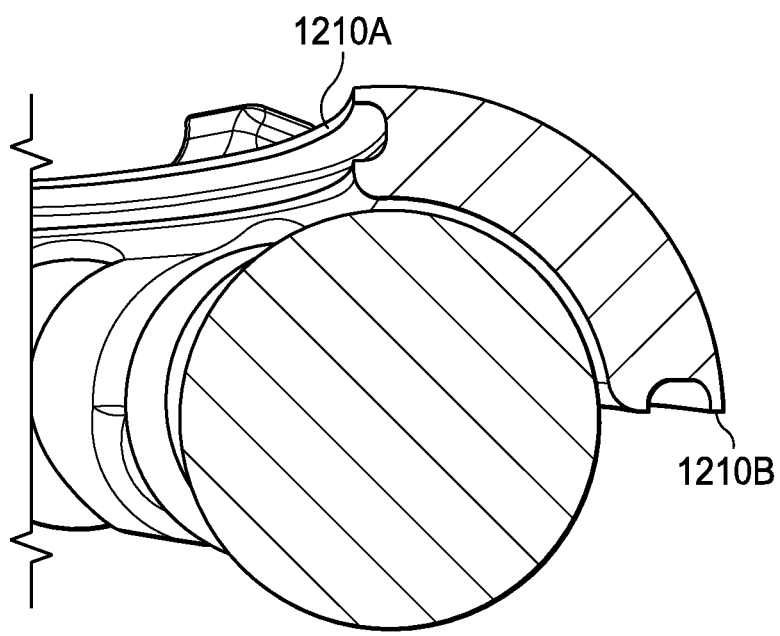
FIG. 12B is a side cross-sectional view illustrating a seal groove feature of the integrated root bearing carrier assembly of FIG. 9B.

FIGS. 9A-12B illustrate an embodiment of an integrated root bearing carrier assembly 1100 (which is identical in all relevant respects to the integrated root bearing carrier assembly 164) in greater detail. Referring to FIG. 9A, the integrated root bearing carrier assembly 1100 includes a number of individual carriers, or sections, 1101 each of which comprises a number of integrated bearing separators, represented by separators 1102, and a shield, represented by shield 1104. As shown in the figures, the assembly 1100 includes four individual carriers 1101; however, it will be noted that any number of carriers may be employed in various embodiments. In certain embodiments, separators 1102 function as spacer elements between bearings, represented by bearing 1106. Additionally, as will be described in greater detail hereinbelow, separators 1102 function to retain the bearings 1106 within the integrated root bearing carrier assembly 1100. The shield 1104 shields the bearings 1106 from debris and retains necessary lubricant around the bearings. As best shown in FIG. 11, each of the individual carriers 1101 includes ball receiving recesses, represented by recess 1110, defined by adjacent pairs of separators 1102 for receiving and retaining bearings 1106. A clearance cut at each ball receiving recess 1110 allows a bearing to be installed into the recess. In certain embodiments, the clearance cut is slightly smaller than the diameter of the bearing to enable the bearing to be snapped into place and retained within the recess until it is later manually snapped out of the recess. As best shown in FIGS. 9A, 9B, and 10, separators 1102 may be attached to and/or integrated with the shield 1104. As best shown in FIGS. 9A and 10, each of the carrier sections 1101 may include one or more handles or other features to aid handling and installation thereof, represented by a handle 1120. Additionally, a linking mechanism may be provided to enable carrier sections 1101 to be connected to one another and to maintain proper spacing therebetween. For example, in certain embodiments, each carrier section 1101 may include a dome-shaped protrusion 1200 on a first end 1202 thereof and a corresponding bowl-shaped indentation 1204 on an opposite end 1206 thereof. As shown in FIG. 12A, the bowl-shaped indentation 1204 of a first carrier section is sized and positioned appropriately to receive and retain the dome-shaped protrusion 1200 of an adjacent carrier section, thereby to serve as a linking mechanism between the two sections. It will be recognized that various shapes, sizes, and configurations may be used for the mating portions of the linking mechanism to perform the function of aligning and maintaining alignment of the carrier sections to form the assembly. Still further, as shown in FIG. 12B, lips or other features, represented in FIG. 12B by seal grooves 1210A, 1210B, may be provided for receiving soft sealing material, such as an O-ring, for enhancing retention of lubricant around the retained bearings.

The components of rotor assembly 108 may comprise any materials suitable for use with an aircraft rotor. For example, rotor blades 114 and rotor hub 124 may comprise carbon fiber or aluminum; and rotor mast 128, control tube 130, rotor hub 124, outer race 142, inner race 152, mast nut 168, mast adapter 146 may comprise steel or titanium. While rotor hub assembly 108 are shown with four rotor blades 114, respectively, it should be understood that they may have as few as two rotor blades and may have more than four rotor blades.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru-Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. An apparatus comprising a bearing carrier assembly including:
   a circular shield having a top surface and a bottom surface; and
   a number of bearing separators integrated with the bottom surface of the shield;
   wherein each pair of bearing separators defines a receptacle for receiving and retaining a bearing therewithin and wherein the shield blocks the received bearings from debris and retains lubricant around the received bearings;
   wherein the bearing carrier assembly comprises a plurality of carrier sections that interconnect to form the bearing carrier assembly; and
   wherein at least one of the carrier sections includes a handle for facilitating handling of the carrier section.

2. The apparatus of claim 1, wherein each of the bearing separators comprises a spacer element for separating adjacent ones of the bearings.

3. The apparatus of claim 2, wherein each of the carrier sections includes a linking mechanism for interconnecting the carrier section to an adjacent one of the carrier sections.

4. The apparatus of claim 3, wherein the linking mechanism comprises a protrusion disposed on a first end of a first one of the carrier sections designed to mate with an indentation disposed on a second end of an adjacent one of the carrier sections.

5. The apparatus of claim 3, wherein each of the carrier sections comprises a protrusion on a first end thereof and an indentation corresponding to the protrusion on a second end thereof.

6. The apparatus of claim 1 further comprising a groove disposed about a circumference thereof for retaining a seal.

7. The apparatus of claim 1, wherein the bearings comprise spherical bearings.

8. The apparatus of claim 1, wherein each of the receptacles includes a clearance cut smaller than a diameter of the spherical bearings such that the bearings may be manually snapped into and out of the receptacle.

9. A blade root bearing carrier for a rotor assembly, the blade root bearing carrier comprising:
   a plurality of interconnectable carrier sections that when interconnected comprise:
      a circular shield having a top surface and a bottom surface; and
      a number of bearing separators integrated with the bottom surface of the shield;
   wherein each pair of bearing separators defines a receptacle for receiving and retaining a bearing therewithin and wherein the shield blocks the received bearings from debris and retains lubricant around the received bearings;
   wherein at least one of the carrier sections includes a handle for facilitating handling of the carrier section.

10. The blade root bearing carrier of claim 9, wherein each of the bearing separators comprises a spacer element for separating adjacent ones of the bearings.

11. The blade root bearing carrier of claim 9, wherein each of the carrier sections includes a linking mechanism for interconnecting the carrier section to an adjacent one of the carrier sections.

12. The blade root bearing carrier of claim 9, wherein the bearings comprise spherical bearings.

13. The blade root bearing carrier of claim 9, wherein each of the receptacles includes a clearance cut smaller than a diameter of the spherical bearings such that the bearings may be manually snapped into and out of the receptacle.

14. A method comprising:
   interconnecting a plurality of carrier sections to create a blade root bearing carrier, wherein the blade root bearing carrier comprises a circular shield having a top surface and a bottom surface, a number of bearing separators integrated with the bottom surface of the shield and wherein each pair of adjacent bearing separators defines a receptacle for receiving and retaining a bearing therewith and wherein at least one of the carrier sections includes a handle for facilitating handling of the carrier section; and
   inserting a bearing into one of the receptacles defined by pairs of adjacent separators;
   wherein at least one of the carrier sections includes a handle for facilitating handling of the carrier section.

15. The method of claim 14 further comprising installing the blade root bearing carrier into a rotor assembly.

16. The method of claim 14 further comprising disassembling the blade root bearing carrier by disconnecting the carrier sections.

17. The method of claim 14 further comprising removing the bearing from the one of the receptacles.

\* \* \* \* \*